United States Patent Office 2,995,534
Patented Aug. 8, 1961

2,995,534
COATINGS FOR MASONRY BUILDING UNITS
Alfred Byron Adams, Melrose, and Tadius T. Sadoski, Salem, Mass., assignors to W. R. Grace & Co., Cambridge, Mass., a corporation of Connecticut
No Drawing. Filed Nov. 5, 1958, Ser. No. 771,941
3 Claims. (Cl. 260—23)

This invention relates to improved coatings for masonry building units, more particularly this invention relates to a novel composition which may be utilized in coating masonry building units.

Many conventional masonry building units, such as cement block and cinder blocks, possess rough, porous and comparatively unattractive surfaces and it became apparent to the industry that such surfaces could be coated for either a decorative or a structurally functional purpose. One of the first conventional surface coats utilized on such surfaces was an ordinary paint composition but it was found extremely difficult to produce a smooth decorative and attractive finish on these surfaces because the fluid agents in such compositions were generally absorbed into the pores of many of these type units giving the final coated surface a somewhat dissipated appearance. Some of the more conventional compositions utilized for such coating purposes have been generally inorganic in nature, for instance ceramic tiles, glass frits or ordinary cements. In many cases it has been found that these inorganic materials serve their decorative purpose, however, their overall utility is somewhat limited due to the inherent characteristics of the final surface coat that they form. Generally the final surface coats formed by such inorganic materials not only possess porosity and brittleness which are relatively poor characteristics for these type surfaces, but in many cases these final surfaces exhibit a susceptibility to either efflorescence or metallic stain which may somewhat curtail their aesthetic vallue. In the case of the ceramic tile surfaces it is generally necessary to use special techniques to ordinarily tool the surface. Further, in some instances it is commercially unattractive to utilize such inorganic surfaces because in many cases it has been found that only a limited size building unit may be faced due to the degree of shrinkage of such coatings during the fusing and curing stages of the conventional processes.

A more recent innovation in surface coating compositions for masonry building units has been the utilization of a moldable polyester type resin based fluid composition, most generally extended with inorganic filler compounds, which may be cured to the solid state while in contact with the surface of a masonry building unit. The aesthetic or decorative effect of the surfaces formed from these resins is relatively good. However, it has been found that in many cases to obtain the desired aesthetic effect many of the desirable structural characteristics are impaired with the result that frequently a surface is obtained which will have a comparatively high degree of brittleness with a dow degree of impact resistance. Further indications are that during a comparatively normal life span the cleanability of such polyester surfaces becomes very poor and also during this time these surfaces undergo relatively pronounced color changes. It is known that in a number of cases where the polyester based surfaces are applied to conventional building units the weight of such unit is significantly increased due to the fact that a comparatively large amount of composition is generally required for such function and this fact alone may quite well influence the type of structural designs in which this unit will be acceptable.

We have discovered a novel composition which may be applied to masonry building units to form a surface coating which is not only comparatively less brittle, but it also has a relatively higher abrasion resistance and is more readily cleaned than many of the surface coatings which have been heretofore produced. The surface coatings formed from the present composition are not only more durable than the cement type masonry facings, but they also are less brittle than either ceramic or cement surface coats. It has further been found that the surface coats produced from the present composition may be ordinarily tooled, i.e., nailed, sawed, or a screw may be applied to them, without the utilization of special skills. Another advantage of the present composition is the fact that it forms surface facings which are comparatively more level, homogeneous, smooth, impervious, and more readily cleaned than painted masonry building units.

The composition of this invention includes a polyvinyl chloride resin based component dispersed in a fluid medium composed of two or more plasticizers one of which is polymerizable and may also include a catalytic medium to aid curing the resinous components, one or more suitable filler agents one of which is sand in substantial quantities.

Although it is generally a tendency for many vinyl compositions to exhibit more or less poor bonding characteristics, it has been found that the present composition is unique because it exhibits most generally an intimate and permanent bond between its component parts and the surface of the masonry building unit to which it is applied. It has also been found that the surface coatings produced by this composition are not only about 170% harder, more scratch resistant and more resistant to discoloration at higher temperatures than many of the general vinyl compositions known to date, but also as determined by simulating tests the bond exhibited by the cured composition will withstand any of the normal stresses and strains which may be encountered in the average life span of a commercial building.

There are two basic requirements in the formulation of any fluid composition of the present type. It must have satisfactory flow properties for the intended method of application and it must give the desired end properties after fusion. Both of the aforesaid properties are influenced by the kind and amount of the ingredients present in the composition.

Initially all of the fluid components of the compositions are mixed in a conventional stirring vessel. One of these fluid components is a polymerizable plasticizer. A function of this fluid plasticizer is to transform itself into a solidified mass when subjected to temperature within the curing range of the polyvinyl chloride resinous component of the composition. It has been found that this plasticizer will initially act as somewhat of a dispersant and carrier for the dry ingredients of the composition when they are added to the fluid system aiding in producing a fluid moldable mass. Generally, this plasticizer will exert a slight degree of solvating action upon the resin when it is in the uncured state but this solvating action will substantially cease after the heating stage of the process because this plasticizer will itself polymerize to produce a solidifying matrix. The polymerizable plasticizers which may be utilized in the formulation of the present composition are the epoxy plasticizers such as diglycidyl ethers of bisphenol A (i.e. bis[4-hydroxyphenyl]dimethyl methane) commercially available under the tradename of "Epon 828" produced by the Shell Company, divinyl esters such as divinyl sebacate, divinyl isosebacate, and divinyl adiphate, acrylates such as glycidyl methacrylate monomer, polyethylene glycol dimethacrylate, and polyester resin mixtures such as that of a resinous product known as "Paraplex P–43" made and sold by Rohm and Haas (believed to be a condensation product of propylene glycol and dipropylene glycol with phthalic anhydride and maleic anhydride), and a resinous product commercially known as "Paraplex P-13," made and sold by the same company believed to be a condensation product of ethylene glycol and diethylene glycol with phthalic anhydride, maleic anhydride and adipic acid. We have obtained especially satisfactory results when polyethylene glycol dimethacrylate was utilized as the polymerizable plasticizer. Most generally the viscosity of this plasticizer should be between about 1 centipoise and about 40 centipoise at 24° C. We have found that a ratio of between about 40 parts to about 80 parts by weight of polymerizable plasticizer to about 100 parts by weight of resin may be used in the present composition, but preferably we use a ratio of between about 50 parts to about 75 parts of polymerizable plasticizer to 100 parts of resin because we have found that the desired filler carrying capacity of the system is not achieved until about 50 parts of this type of plasticizer are used in the system, but also that beyond about 75 parts the properties of the mass are not substantially improved. Optimum characteristics were obtained when a ratio of about 73.5 parts of polymerizable plasticizer to about 100 parts of resin was utilized in the composition.

Another fluid composition incorporated into the composition is a conventional plasticizing component. Due to the fact that the polymerizable plasticizer does not solvate the resin to the degree that is desired, we have utilized a conventional plasticizer to obtain the desired level of solvation. It is also a function of this type plasticizer to substantially maintain its solvating action upon the polyvinyl chloride resin at temperatures within the temperature range to which the composition is subjected. It has also been found that the use of this type plasticizer imparts a desirable degree of flexibility to the cured mass which tends to avoid a product which is susceptible to brittleness. There are a number of conventional plasticizers which may be incorporated as a component in the present composition, for instance dioctyl phthalate, trioctyl phthalate, tricresyl phthalate, tributyl phosphate, 2-ethyl hexyl diphenyl phosphate and sebacate type plasticizers such as dioctyl sebacate and dibutyl sebacate. We preferentially have utilized the phosphate type plasticizers such as 2-ethyl hexyl diphenyl phosphate because it imparts self extinguishing properties to the final cured mass. Satisfactory results may be obtained when this type plasticizer is used in the ratio of between about 17 parts to about 60 parts by weight of plasticizer to about 100 parts by weight of resin, and optimum results were obtained when the ratio utilized was about 19 parts plasticizer to about 100 parts resin. If a quantity of plasticizer is utilized which is below about 17 parts the mass will not cure as desired. It has been found that if the cured mass possesses a high degree of brittleness that it may be due to the insufficient fluidity of the system during the molding process, however, if more than about 60 parts of plasticizer is used the desired durability and toughness of the final coat is materially reduced.

Other fluid components which may be incorporated during the initial mixing stage of the formulation include viscosity depressants. The initial viscosity of the present fluid composition is largely dependent upon the viscosity of the plasticizing components themselves, but on aging it is the tendency of some plasticizers to solvate or swell the resinous particles at room temperature and the viscosity of the system would rise accordingly. To aid in the quality control of the fluid mass and to enhance its shelf life we have added a viscosity depressant to the fluid system when it is desired to store the same for any length of time. There are a number of depressants which may be utilized in the present composition with the basic requirements being that it must be compatible with the other components of the composition, for instance, either of the following may be used as a viscosity depressant, i.e., mixtures of glycolic esters of caprilic and caproic acid, such as that commercially available under the tradename of "Drew's SC" from the E. F. Drew Company which is thought to be a mixture of triethylene glycol dicaprate and triethylene glycol dicaprylate, tetraethylene glycol pelargonate, "Paraplex G-60," and "Paraplex G-62," commercially available from the Rohm and Haas Company, and believed to be epoxidized triglycerides, polyglycol adipate, and a soya oil, containing about 65% lecithin, xylene, and 1,1,1-trichloroethane. Satisfactory product results have been obtained when a mixture of glycolic esters of caprylic and caproic acid, such as that commercially available under the tradename of "Drew's SC" from the E. F. Drew Company which is thought to be a mixture of triethylene glycol di-caprate and triethylene glycol di-caprylate, were used as viscosity depressants in the present system. When any one of the aforesaid depressants was used it was found that such agent would not only act as a depressant but also as a carrier for the polyvinyl chloride resin and fillers materially aiding in the maintenance of the fluidity of the system thereby allowing the economical reduction in the amount of total plasticizer fluids which may be used for this function. We have found that a ratio of between about 1 part and about 10 parts by weight of depressant to about 100 parts by weight of resin may be utilized, but we have preferentially utilized a ratio of about 4 parts of depressant to about 100 parts of resin because optimum product characteristics were obtained in this range.

Also, a free radical producing catalyst is incorporated in the present composition to aid in substantially curing the polymerizable plasticizer during the heating stage of the process. We preferentially utilized t-butyl perbenzoate as the catalyst when polyethylene glycol dimethacrylate is used as the polymerizable plasticizer in the composition because not only is optimum pot life facilitated at room temperature but also substantially uniform cure properties are obtained after polymerization of both the resinous component and the plasticizer. There are other suitable catalysts which may be utilized depending upon the specific polymerizable plasticizer and these will be most generally apparent to those in the polymer art, for instance the following: ditertiary butyl peroxide; benzoyl peroxide; alpha,alpha,azo-bis - iso - butyronitrile; methyl ethyl ketone peroxide and dicumyl peroxide. The catalyst may be present in the ratio of between about 0.73 part to about 6 parts of catalyst to about 100 parts of resin with the optimum curing results being obtained when the ratio is about 1.25 parts of catalyst to about 100 parts of resin.

At this point in the formulation we preferentially stir in the fillers, pigments and inhibitors which are desired to be incorporated into the composition, but these type ingredients may be incorporated at either an earlier or later stage of the formulation procedure. The function of the fillers is primarily to give bulk to the fluid composition but it is also known that certain fillers may impart desirable characteristics to the final surface coat, for instance increased hardness, enhanced scratch resistance, and durability to the finished surface. It may be seen that if the overall bulk of the composition is increased by the addition of inexpensive fillers that the ratio of the weight of the comparatively expensive resin to the weight of the total mass is relatively decreased, enhancing the commercial attractiveness of such coating composition. The addition of a filler to a fluid composition of the present type most generally increases its viscosity because the quantity of plasticizers used to wet the fillers is unavailable to contribute to the fluidity of the resinous mass. For the aforesaid reason, fillers should be chosen with some consideration for their plasticizer wetting requirement. Some of the conventional fillers which have been used in the present type fluid composition have been calcium carbonates, conventional clays, surface treated clays, abestine, fine silicas and barytes. The quantity of fillers utilized in this composition is variable and depends upon the particular filler utilized and the degree of the characteristics which are desired to be imparted to the product coat. Usually a ratio of between 0 part to about 255 parts by weight of filler to about 100 parts by weight of resin may be utilized but we have found that satisfactory flow characteristics are obtained when the ratio of about 11 parts of filler to about 100 parts of resin is used. Further, it may be stated that although we may utilize a higher filler and sand loading in the present composition in comparison to the conventional compositions, the present fluid composition will still maintain its self leveling characteristics because of the utilization of a two or three component plasticizing system which serves as a dispersion and carrier medium for the resinous material. It has also been noted that below about 11 parts by weight of filler to about 100 parts by weight of resin that the characteristics imparted to the composition by the fillers are not enhanced, while above a ratio of about 255 parts of filler to about 100 parts of resin the viscosity of the mass is relatively increased, adversely affecting the fluid properties of the mass and resulting in poor sand carrying capacities, and poor molding characteristics.

In many instances a surface coat is applied to a masonry block unit not strictly for a structurally functional reason but rather to produce an aesthetic or decorative surface on the unit. It is common knowledge that many pigments may be added to coating compositions to produce a coloring or an aesthetic effect and the formulation of the various pigment compositions is within the scope of operations of the average paint chemist. The subject of pigment formulation will not be given extended description here for it is felt that it will suffice to say that any formulation of pigments which will be compatible with the components of the present composition may be used in this fluid system, for instance titanium dioxide, toluidine red, chrome yellow, Prussian blue, and chrome green. Satisfactory decorative characteristics were achieved when a high intensity coloring agent with white tinting agents and pigment extender, such as a formulation containing copper phthalocyamine blue as coloring agent, tinted with titanium dioxide, and extended with calcium carbonate, was used in the present composition. We have found that a ratio between about 9 parts by weight of pigment formulation to about 100 parts by weight of resin may be advantageously utilized in the present process.

Somewhat of a general characteristic of vinyl chloride polymers is the fact that they discolor and produce hydrogen chloride when subjected to the influence of heat. It is commonly felt that in theory this discoloration may be due in some degree to ethylenic bonds which are produced by the displacement of the hydrogen and chlorine from their respective positions in the polymeric system and also this discoloration is somewhat intensified because the presence of this acid generally influences a migration of the ethylenic bonds to a conjugated position. To increase the color stability of compositions containing this type of polymer it is generally necessary to incorporate as an additional component one or more stabilizing agents whose function it is to decrease the intensifying influence of this acidic condition either by reacting with the hydrogen chloride produced in the system, or by undergoing a common addition reaction involving the ethylenic bonds which somewhat decreases the coloration influence of the bond, or by both absorbing the acid and undergoing an addition reaction involving the ethylenic bond. Some of the more conventional stabilizers which may be incorporated in the present composition are inorganic oxides, salts of inorganic bases with weak acids, organometallic compounds such as organo-tin, maleic acid, alkali metal salts of complex phosphates, and various glycidyl compounds of the allyl glycidyl ether type.

It is also well known that vinyl chloride polymers tend to degrade and achieve a high degree of brittleness when subjected to the influence of heat. In theory, it is generally felt that this degradation may be due to the exposure of the ethylenic bonds produced in the relatively long polymer chain to an oxidizing atmosphere which may result in some degree in an oxidative cleavage of the ethylenic bond and the production of comparatively smaller chain polymer. There are many types of stabilizers which may be incorporated in the present composition to decrease this type of degradation and most generally many of them form an addition product involving the ethylenic bond decreasing the oxidation susceptibility of the polymeric system.

Many times it has been found that some degree of ultraviolet light will produce a detrimental effect upon the composition such as discoloration and embrittlement. There are many light-stabilizers which may be used in the present composition to inhibit this effect, for example those of the substituted benzophenone structure. To preserve the desired characteristics of the present composition and to aid in facilitating an adequate quality control of the final surface product we have also added stabilizers of the aforesaid type to decrease the deleterious effects of heat and light upon the composition. It has been found that satisfactory overall inhibition against the effects of heat and light is obtainable when the stabilizer utilized in the composition may be either of the following components or mixture thereof, i.e. lead compounds such as di-basic lead phosphite, epoxy compounds such as allyl glycidyl ether, and substituted benzophenone compounds such as 2,2'-dihydroxy-4,4'-dimethoxy-benzophenone. We have found that a ratio between about 1 part to about 15 parts by weight of stabilizer(s) to about 100 parts by weight of resin may be utilized in the present composition but we have obtained satisfactory results when a ratio of about 3.5 parts by weight stabilizer to about 100 parts by weight resin had been utilized in the present composition.

After the pigments, fillers, and inhibitors are somewhat uniformly dispersed through the fluid mass the polyvinyl chloride based resinous material is added while agitation of the fluid mass is continued. Any conventional paste grade vinyl chloride polymer or copolymer is satisfactory. This agitation may be carried out in conventional open type or closed type mixers, we have preferentially utilized a closed type mixer and have agitated the mix under a vacuum equivalent to about 25 inches of mercury at room temperature as a precaution against the entrapment of air in the present fluid composition. After the polyvinyl resinous material is substantially dispersed throughout the fluid mass we have preferentially allowed the fluid mass to stand without agitation for a period of between about 2 hours to about 24 hours in order to facilitate the removal of any air that may be entrapped in the composition. At this point in the formulation the viscosity of the fluid mass may be between about 20 centipoises and about 700 centipoises, but better flow characteristics are obtained if the viscosity of the mass is between about 30 centipoises and about 400 centipoises, and the optimum working properties are obtained when the viscosity of the mass is between about 40 and about 200 centipoises. The aforesaid viscosities were experimentally determined by using a Brookfield viscometer equipped with an appropriate numbered spindle, i.e. 2 or 3 and operated at about 30 revolutions per minute at about 24° C.

Although many silica compositions such as sand are most generally members of the conventional filler family heretofore described, we are describing its separate utilization as a component in the present composition because not only does it aid in substantially increasing the bulk of the resinous mass but also it has been found that it extremely enhances the rigidity, durability, scratch resistance, and hardness of the final surface coat. Further, it may also be stated that in the present composition the sand also functions to enhance the final bonding characteristics of the resinous mass to relatively rough surfaces. The fluid mass may be agitated simultaneously with the metering of the sand into the mass to insure a somewhat uniform dispersion, or the sand may be added to the mass followed by an agitation period.

There are many types of sand of varying shapes and particle size which may be utilized in the present composition. For certain desired characteristics it may be more beneficial to use specific shapes and definite sizes of particles, but it has been found that any size and shape sand particle may be utilized in the admixture without deleterious effects if the quantity of sand is regulated. For example, the viscosity of the fluid mass and the density of the final surface product is somewhat influenced by the addition of sand and it has been found, to maintain a workable mass, a relatively small volume of sand should be utilized if the sand particle size is comparatively large. In many cases it is desired to increase the density of the working mass because this will most generally enhance the hardness of the final surface and in such situations the optimum density would be approached by utilizing a relatively large amount of comparatively smaller sand particles, but by routine formulation of sand particle size a large variation of specific densities may be obtained by regulating the amount of sand added. We have preferentially utilized a silica sand of the type commercially sold under the trade name of "Banding Sand" which is a product of The Ottawa Silica Company. This type of sand is essentially white in color and is substantially uniform in grading and ingredients and has a conventional mesh size of between about 50 and about 200 mesh, and most generally a substantial amount of the individual particles are somewhat round, relatively smooth and comparatively hard particles. It has been found that by the addition of this type sand to the fluid mass only a minimum increase in viscosity is achieved per unit weight of sand to fluid mass. We have found that the sand may be present in an amount up to about 1,000 parts by weight of sand to about 100 parts by weight of resin in the present formulation. However, preference is given to a sand ratio of between about 316 parts to about 700 parts of sand to about 100 parts of resin because if a sand ratio in this range is utilized the fluidized mass has relatively good flow properties. It is felt that the rigidity of the mass is comparatively reduced if the amount of sand used in the system is below about 316 parts sand to about 100 parts resin, while if a quantity of sand is used which is greater than about 700 parts sand to about 100 parts resin the fluidity of the uncured mass is relatively poor for successful molding results. The viscosity of the fluid mass at this point in the formulation may be between about 3,500 centipoises and about 22,000 centipoises but preferentially the viscosity is between about 4,800 centipoises to about 13,000 centipoises because the desired flow characteristics of the mass are enhanced in this range, and optimum product characteristics were obtained when the viscosity of the fluid coating composition is between about 6,000 centipoises and about 9,000 centipoises. The aforesaid viscosities were experimentally determined by using a Brookfield viscometer equipped with an appropriate spindle, i.e. either a number 3 or number 4 spindle, and operated at 30 revolutions per minute at about 24° C.

It has also been found that if the sand used in the present process is treated with a silicone monomer solution that the hardness of the final surface coat product is increased at least 3 points on the Shore D durometer hardness tester. The silicone monomer solution which is utilized is commercially available under the trade name of "Vinyl Silane A172" produced by Union Carbide Corporation. This silane solution may be used in the ratio of between about 1 gram to about 2.5 grams of silane to about 5,000 grams of sand which is an extremely small percentage of approximately between about 0.02% and about 0.05% of the total weight.

The formulation of the composition of the present invention, including some variation of the component parts of the compositon, will be more fully understood from the following examples which describe the formulation procedure utilized in some cases. It is to be fully understood that the following examples are only by way of illustration and not to be construed as a limitation on the appended claims because there are many conventional procedures which may be utilized in formulating the present composition.

*Example I*

253 grams of 2-ethyl hexyl diphenyl phosphate, 973 grams of polyethylene glycol dimethacrylate, 53 grams of a vegetable oil plasticizer commercially available under the trade name of "Lypal SC" from the E. F. Drew Company, were poured into a 1 gallon open top container and the fluid mixture was stirred by means of a steel propeller attached to and driven by a motor of about ⅓ horsepower for 10 minutes, at which time the fluid mixture was poured into a 3 gallon bell jar.

Each of the following dry ingredients were weighed out on a conventional rough balance and poured into a separate 1 gallon open top container: 25 grams of titanium dioxide, 43 grams of dibasic lead phosphite, 76 grams of pigment, 120 grams of calcium carbonate commercially known as Royal York Whiting. Subsequently, the container containing these aforesaid ingredients was emptied into a 3 gallon bell jar containing the fluid mixture.

At this point a steel plate, equipped with a vacuum drawing nozzle and a steel propeller having a 2 inch blade was mounted upon the greased surface of the top of the bell jar. This bell jar was positioned below the ⅓ horsepower motor and the propeller shaft, was attached thereto. A vacuum of about 26 inches of mercury was applied to the inside of the bell jar, and the contents contained therein were mixed for 2 hours at which time substantially all of the air in the fluid mass has been evacuated.

The bell jar containing the fluid mass now emptied into a 5 gallon air-driven mixer which was vacuum equipped. 1333 grams of polyvinyl chloride resin were added to the fluid mass in the mixer followed by the subsequent addition of 6980 grams of sand. At this point 15 grams of t-butylperbenzoate was added to the ingredients in the mixer and the top placed thereon and locked in position. A vacuum of about 26 inches of mercury was applied to the ingredients and they were agitated for 30 minutes, at which time this formulated coating composition was utilized in the molding procedure.

An appropriate quantity of this composition was charged into a conventional enameled surfaced mold and was allowed to substantially level therein. A reticulate mat made from glass having a thickness of about 0.10 inch was placed on a face of a masonry building unit, and the unit was surmounted upon the upper surface of the coating fluid. A downward force of between about 200 and about 300 pounds was applied to the upper surface of the building unit while the temperature of the contents of the mold was raised to about 170° C. and maintained at this temperature for about 6 minutes to solidify the composition. The mold and its contents were allowed to return to room temperature and the coated building unit was removed from the mold.

*Example II*

190 grams of 2-ethyl hexyl diphenyl phosphate, 730 grams of polyethylene glycol dimethacrylate, 40 grams of a plasticizer commercially available under the trade name of "Lypol SC" from E. F. Drew Company, were poured into a 1 gallon open top container and the fluid mixture was stirred by means of a steel propeller attached to and driven by a motor of ⅓ horsepower for 10 minutes, at which time the fluid mixture was transferred into a 3 gallon container.

Each of the following dry ingredients were weighed out on a conventional rough analytical balance and poured into a 1 gallon open top container: 30 grams of titanium dioxide, 32 grams of dibasic lead phosphite, 46 grams of pigment, 90 grams of calcium carbonate commercially known as Royal York Whiting, and 2 grams of 2,2'-dihydroxy-4,4'-dimethoxy-benzophenone. Subsequently, the container containing the dry ingredients was emptied into the aforesaid 3 gallon container.

An impeller equipped shaft of a Premier mill was inserted into the 3 gallon container, and the motor was turned on. After the ingredients contained in this 3 gallon container were intimately dispersed they were transferred into an appropriate sized vacuum jar and a vacuum of about 29.5 inches of mercury was applied for 5 minutes.

Subsequent to this vacuum treatment the dispersion was placed into a 2 gallon container and 1,000 grams of paste grade polyvinyl chloride was slowly stirred into the dispersion by means of an electric driven impeller for a period between about 3 to 5 minutes. The dispersion was then subjected to a vacuum of 29.5 inches of mercury for about 2 hours.

Following this resinous dispersion stage 9.5 grams of t-butyl-perbenzoate and 5,215 grams of "Banding Sand" available from the Ottawa Silica Company were added to the contents of the 2 gallon container and the mixture was stirred under a vacuum of approximately 25 inches of mercury for a period of 2 hours.

Although the fluid composition may be charged into the mold forming equipment after the sand is uniformly dispersed throughout the fluid mass, we preferentially have allowed the fluid mass to stand for a time period of more than about 24 hours to substantially aid in the removal of any air from the composition. At the end of this standing interval the fluid mass is restirred and is ready to be utilized in the molding procedure set forth in Example I.

*Example III*

600 grams of 2-ethyl hexyl diphenyl phosphate, 400 grams of diglycidyl ethers of bisphenol A (i.e. bis[4-hydroxyphenyl] dimethyl methane), 40 grams of a vegetable oil type plasticizer commercially available under the tradename of "Lypol SC" from the E. F. Drew Company were poured into a 1 gallon open top container and the fluid mixture was stirred by means of a steel propeller attached to and driven by a motor of about ⅓ horsepower for 10 minutes, at which time the fluid mixture was poured into a 3 gallon bell jar.

Each of the following dry ingredients were weighed out on a conventional rough balance and poured into a separate 1 gallon open top container: 30 grams of titanium dioxide, 32 grams of dibasic lead phosphate, 1 gram of pigment, 60 grams of calcium carbonate commercially known as Royal York Whiting. Subsequently, the container containing these aforesaid ingredients was emptied into a 3 gallon bell jar containing the fluid mixture, and about 10 grams of a catalyst mixture containing 6 parts of triethyltetramine and 4 parts of diethylenetriamine was added thereto.

At this point a steel plate, equipped with a vacuum drawing nozzle and a steel propeller having a 2-inch blade was mounted upon the greased surface of the top of the bell jar. This bell jar was positioned below the ⅓ horsepower motor and the propeller shaft was attached thereto. A vacuum of about 26 inches of mercury was applied to the inside of the bell jar, and the contents contained therein were mixed for 2 hours at which time substantially all of the air in the fluid mass has been evacuated.

1,000 grams of polyvinyl chloride resin were added to the fluid mass in the mixer followed by the subsequent addition of 8,700 grams of sand. At this point the top was placed thereon and locked in position. A vacuum of about 26 inches of mercury was applied to the ingredients and they were agitated for 30 minutes, at which time this formulated coating composition was utilized in the molding procedure set forth in Example I.

Surface coats produced by the aforesaid mold process, utilizing the present composition as base material, were subjected to the following tests and the accompanying results were obtained.

*Wear resistance.*—Specimens of surface coats made from the present composition were individually mounted in line with a ¼ inch inside diameter orifice of a sand blaster's nozzle, and subjected to blasting by Ottawa silica sand under a pressure of about 60 pounds per square inch for three minutes. These surface coats lost about 0.015% of their original weight during the blasting treatment but this loss was between about 75% and about 2,400% less than the loss exhibited by many surface coats produced by conventional processes.

*Impact strength.*—A steel ball of 1⅞ inches in diameter was dropped on specimens of surface coats made from the present composition. The height of the drop is such that the weight of the ball times the distance is in multiples of one foot pound. The present specimens exhibited a slight dent at 5 foot pounds but this was equivalent to between about 250% to about 500% greater than the impact resistance shown by many of the conventional organic surface coats and a number of ceramic coats.

*Freeze thaw resistance.*—In accordance with the testing procedure set forth in A.S.T.M. Specifications C-292-52T and the C-126-52T specimens of surface coatings produced from the present composition were surrounded by ⅛" of water, and were subjected to freezing and thawing cycles of about 18 hours to about 24 hours each. The temperature range of the freezing cycle was about $-17°\pm1°$ C., while the thawing cycle was about $23°\pm1°$ C. The specimens were examined and the following evaluations were made: some of the surface coatings produced from the present composition exhibited traces of blooming at about 30 cycles of the above treatment, however, there were others of these coatings which withstood as many as 60 cycles of this treatment. In contrast, a number of comparative specimens of conventional surface coats which were tested by these methods withstood only about 26 cycles before exhibiting prominent blooming and ultimate cracking of the face. It is apparent from the aforesaid data that the facing produced from the present composition exhibits a higher freeze thaw resistance than facings produced from conventional compositions. This increase is in the area of about 15.4% to about 130%.

*High temperature resistance.*—In accordance with the testing procedure set forth in the A.S.T.M. Specification D-1300-53T a flat bottom pint can, containing one pound of wax which had been heated to a temperature above about 180° C., was placed upon a surface coat produced from the present composition. The area of the surface coat, which was surmounted by this heated can, was examined for any discernible effects of this heat treatment by reflecting light therefrom and the following results were obtained. The surface coats produced from the present composition exhibited no discernible effects up to temperatures of about 240° C., in a temperature range of between about 247° C. and about 270° C. a very slight discoloration was exhibited, however, at a temperature of about 276° C. a very definite yellowing was shown. In contrast, a number of conventional organic coatings exhibited slight discoloration at about 220° C., and definite discoloration was exhibited by these coatings at a temperature of about 240° C. and higher. It may be seen from the above data, that the surface coats produced from the present composition exhibit a heat resistance which is at least about 27° C. to about 36° C. higher than the reat resistance of conventional coatings.

We claim:
1. A composition for forming decorative face coatings for masonry building units which coatings are charac- terized by superior hardness, scratch resistance, and discoloration resistance, said composition being a substantially air-free polyvinyl chloride resin mixture containing as its sole polymerized resin constituent a paste-grade polyvinyl chloride resin, between 40 and 80 parts of a polymerizable plasticizer selected from the group consisting of polyethylene glycol dimethacrylate and the diglycidyl ether of bis (4-hydroxyphenyl) dimethyl methane, between 0.73 and 6 parts of a compatible catalyst for said polymerizable plasticizer, between 17 and 60 parts of 2-ethyl hexyl diphenyl phosphate, and between 316 and 700 parts of sand having a mesh size in the range of 50 and 200, said composition having a viscosity between 6000 and 9000 centipoises and said parts being based on 100 parts by weight of said resin.

2. The composition of claim 1 wherein said polymerizable plasticizer represents 73.5 parts and said 2-ethyl hexyl diphenyl phosphate represents 19 parts of the composition.

3. The composition of claim 1 wherein said sand is pretreated with between 0.02 and 0.05 part of vinyl silane, said parts being based on 100 parts of said sand.

References Cited in the file of this patent

UNITED STATES PATENTS

| | | |
|---|---|---|
| 2,403,172 | Crowell et al. | July 2, 1946 |
| 2,567,719 | Loritsch et al. | Sept. 11, 1951 |
| 2,611,195 | Brophy et al. | Sept. 23, 1952 |
| 2,618,621 | Burt | Nov. 18, 1952 |
| 2,631,137 | Loritsch et al. | Mar. 10, 1953 |
| 2,682,517 | Asaft | June 29, 1954 |
| 2,843,557 | Safford | July 15, 1958 |